United States Patent [19]
Mahieux

[11] Patent Number: 5,444,741
[45] Date of Patent: Aug. 22, 1995

[54] FILTERING METHOD AND DEVICE FOR REDUCING DIGITAL AUDIO SIGNAL PRE-ECHOES

[75] Inventor: Yannick Mahieux, Lannion, France

[73] Assignee: France Telecom, Paris, France

[21] Appl. No.: 133,201

[22] PCT Filed: Feb. 18, 1993

[86] PCT No.: PCT/FR93/00165
§ 371 Date: Oct. 19, 1993
§ 102(e) Date: Oct. 19, 1993

[87] PCT Pub. No.: WO93/17508
PCT Pub. Date: Sep. 2, 1993

[30] Foreign Application Priority Data
Feb. 25, 1992 [FR] France ................. 92 02164

[51] Int. Cl.$^6$ ................. H04B 1/10; H04B 15/00
[52] U.S. Cl. ................. 375/254; 375/285; 375/343
[58] Field of Search .............. 375/25, 34, 122, 96, 375/58; 381/29, 31, 34, 35; 395/2.21, 2.12; 364/726; 341/200

[56] References Cited
U.S. PATENT DOCUMENTS
5,311,549   5/1994   Mahieux ................. 375/122

FOREIGN PATENT DOCUMENTS
0446031   9/1991   European Pat. Off. .
0466190   1/1992   European Pat. Off. .
8601665   3/1986   WIPO .

Primary Examiner—Stephen Chin
Assistant Examiner—Tesfaldet Bocure
Attorney, Agent, or Firm—Larson and Taylor

[57] ABSTRACT

A method and a system for processing digital audio signal preechoes. Samples x(n) are frequency transform block-coded as coefficients y(k) then transmitted as coefficients Cy(k), decoded as coefficients y(k), and reverse frequency transform processed to recreate the original post-transmission signal x'(n). During the coding process and after the coding of coefficients for the transmission of coded coefficients Cy(k), the coded coefficients Cy(k) are decoded and reverse frequency transform processed to recreate the decoded signal x"(n), which is substantially identical to signal x'(n), and the optimal filtering mask is determined in order to recreate the original signal x(n). The coded coefficients Cy(k) and the gain and filtering mask parameters are simultaneously transmitted to the decoding process. Suitable filtering of the original post-transmission signal x'(n) is performed during the decoding process in order to recreate the original post-transmission and post-processing signal xt(n). The method and system may be used in processing digital audio signals in the phonogram or videogram industries.

8 Claims, 6 Drawing Sheets

SIGNAL CODED-DECODED WITHOUT SPECIFIC
PROCESSING OF PREECHOS
64-kBIT/s CODING USING THE MDCT

FILTERING METHOD AND DEVICE FOR REDUCING DIGITAL AUDIO SIGNAL PRE-ECHOES

BACKGROUND OF THE INVENTION

1. Field of the Invention

The invention relates to a filtering method and device for reducing the preechoes of a digital audio signal.

2. The Prior Art

The storage, transmission or processing of digitized sound signals, digital audio signals, currently comes up against the problem of the necessary digital transmission rate. Techniques such as coding by frequency transform are then used to allow discrimination of the necessary transmission rate, whilst preserving the quality of the original signal.

However, owing precisely to the enormous variety of sound signals, the aforesaid methods or techniques do not always enable the quality of the original signal to be preserved.

Coding by frequency transform has, hitherto, been used widely for coding high-fidelity sound.

Generally, this type of coding proceeds by slicing the time digital audio signal into blocks of N samples, followed by a weighting by a window of each block, then by a time/frequency transformation delivering a set of coefficients, which are coded and finally transmitted. For a more detailed description of this type of coding, reference may profitably be made to the French Patent Application 89 13649, inventor Yannick MAHIEUX, published under number 2 653 280.

Figure 1A:
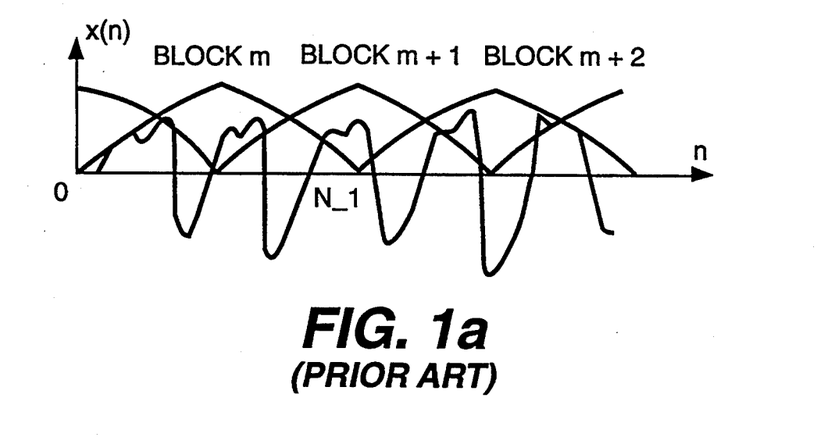

Several frequency transforms may be used, but the Modified Discrete Cosine Transform MDCT, is of particular interest and allows a bigger reduction in the rate, through the use of weighting windows with softened edges, combined with a large overlap of N/2 samples between two successive blocks, as represented in FIG. 1a.

Figure 1B:
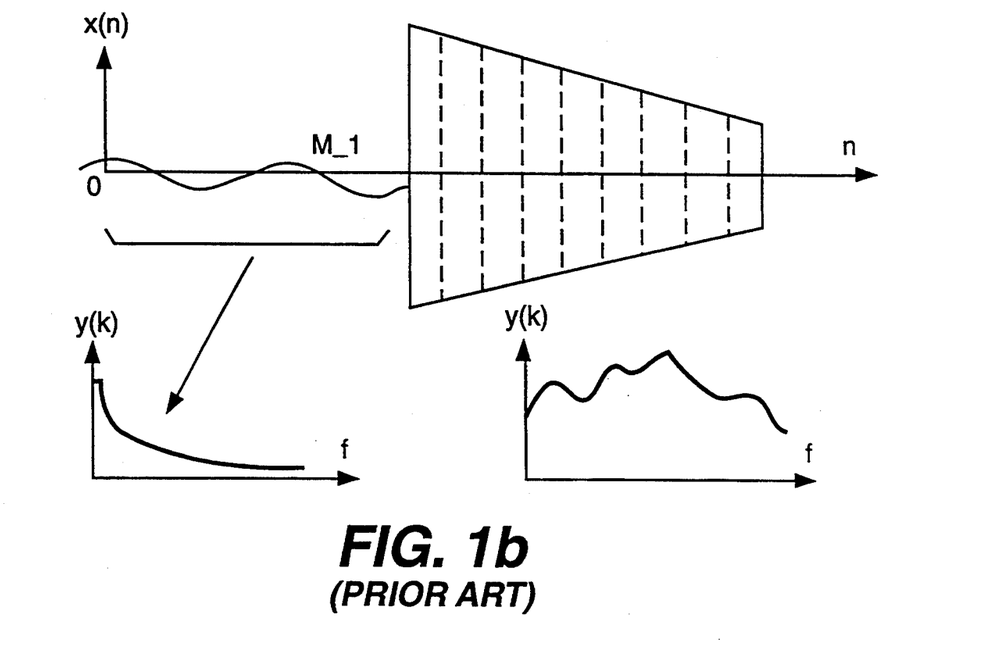

In this type of coding by transform, the coding noise resulting from the quantizing of the coefficients arising from the transform is distributed uniformly throughout the duration of each block. When the sample block contains a nonstationarity such as that caused for example by the sudden plucking of a stringed instrument, see FIG. 1b, the frequency spectrum of the signal is then virtually flat. However, the aforesaid coding processes generally carry out a spectral shaping of the noise, see aforesaid French patent application. Thus, for a block containing a sudden transition, the noise spectrum is virtually flat and of constant level throughout the duration of the block.

Figure 1C:
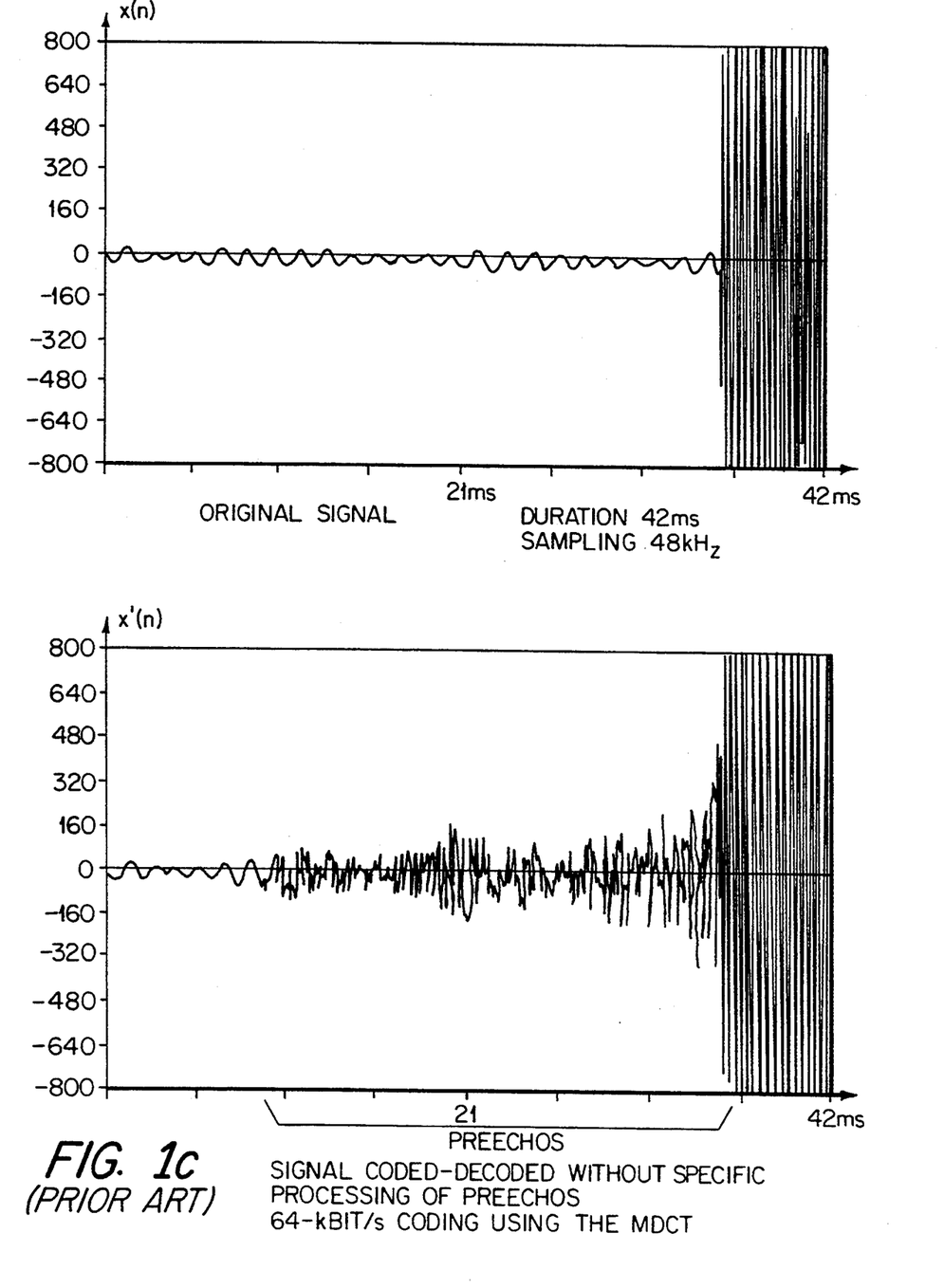

Accordingly, as regards the part of the digital audio signal preceding the plucking, the noise spectrum is much greater than that of the signal and, as represented in FIG. 1c, in the time domain, the decline constituting the preecho phenomenon may be very substantial.

When, on the other hand, the coding system uses the MDCT transform, the two blocks preceding the transition are affected with preechoes, owing to the overlap of N/2 samples between successive windows.

Among the methods proposed for reducing or eliminating preechoes, one of them advocates the use of scale factors applied to the sample block before processing by frequency transform, so as to reduce the difference in level between the parts before and after the transition. On decoding, by applying inverse scale factors, the level of the noise is reduced in the areas of low energy and the preecho phenomenon diminishes accordingly. For a more complete description reference may be made for example to the article by Sugiyama: Adaptive Transform Coding with an adaptive Block Size, Proceedings of ICASSP 90, Albuquerque, pp 1093–1096.

Such a method, when an MDCT transform is used, cannot however be employed since, owing to the scale factors, it is not possible to undertake, coding excepted, perfect reconstruction of the digital audio signal.

A second method, from the aforesaid methods, can consist in the use of blocks of variable length, the size of the transform, for a sample block containing a sudden transition, being reduced to N/8 points, which makes it possible thus to limit the duration of the decline, see for example the document ISO-IEC-WG8-MPEG 89/205.

Although this second method may be employed when an MDCT transform is used, the sample block weighting windows must be modified. Furthermore, it is necessary to detect the transition over the block following the current block being processed, thus increasing the delay of the coding system. Finally, for the blocks of reduced length, the frequency resolution is diminished as is also the effectiveness of the coding accordingly.

Finally, a third method has formed the subject of a French patent application No. 91 03715 filed on 27 Mar. 1991. In the method described in this patent application, the filter, whose parameters vary as a function of the local characteristics of the signal and of the noise, effects at decoder level a filtering of Kalman filtering type on the samples of the reconstructed signal which are affected by the preecho phenomenon.

The solution proposed by the last cited method makes it possible to eliminate the disadvantages inherent in the other two methods mentioned. However, it does not in all cases allow perfect reconstruction of the original digital audio signal for reasons of substantial computational burden, which does not allow real-time processing. Indeed, for the aforesaid reasons, the models used by the filtering of Kalman filtering type are necessarily limited and, this filter being computed adaptively at decoder level, the information available is not always sufficient to define the latter optimally.

SUMMARY OF THE INVENTION

The filter method and device for reducing the preechoes of a digital audio signal which are the subjects of the present invention have the aim of remedying the disadvantages of the prior methods cited above.

The method for processing the preechoes of an original digital audio signal, sequence of samples x(n) consisting of blocks of N samples x(n) transmitted after a process of coding then decoding, the coding process consisting of a step for processing by frequency transform as coefficients y(k) followed by a step for coding these coefficients to provide for the transmission of coded coefficients Cy(k), and the decoding process consisting of a step for decoding the transmitted coded coefficients as coefficients y'(k) followed by a step for processing by inverse frequency transform to recreate the post-transmission original signal x'(n), is notable in that it furthermore consists, during the coding process, after the step for coding the coefficients for transmission of the coded coefficients, in performing a step for decoding the coded coefficients Cy(k) and for processing the coded coefficients by inverse frequency transform to recreate the decoded signal x''(n), then in determining the optimal filtering template from a given set of filtering templates and the gain parameters of the associated filtering in order to recreate the original signal x(n). The gain and filtering template parameters and the coded coefficients Cy(k) are transmitted simultaneously to the decoding process. After the step for decoding the transmitted coefficients and the step for processing by inverse frequency transform to recreate the post-transmission original signal x'(n), the matched filtering of this signal is performed to recreate the post-transmission and post-processed original signal xt(n).

The system for processing the preechoes of an original digital audio signal, sequence of samples x(n) consisting of blocks of N successive samples, transmitted between a coder device and a decoder device, the coder device including a module for processing by frequency transform as coefficients y(k) and a module for coding these coefficients to provide for the transmission of the coded coefficients and the decoding device including a module for decoding the transmitted coded coefficients as coefficients (y'k) and a module for processing by inverse frequency transform to recreate the transmitted original signal x'(n), is notable in that it furthermore includes at the level of the coder device, downstream of the coding module, a module for decoding the coded coefficients delivering estimated coefficients, a module for processing the estimated coefficients by inverse frequency transform to recreate the decoded signal x"(n) and a module for selecting the optimal filtering parameters and for storing the matched filtering parameters, gain g(j) and template Hj(f) of this matched filtering. A circuit for time-multiplexing the coded coefficients and the matched filtering parameters makes it possible to provide for the simultaneous transmission of the latter to the decoder device.

The method and system which are the subjects of the invention find an application to the processing, transmission and storage of digital audio signals in the phonogram or videogram industry.

BRIEF DESCRIPTION OF THE DRAWINGS

A more detailed description of the method and system which are the subjects of the present invention will be given below in the description and the drawings in which, apart from FIGS. 1a to 1c relating to the prior art.

DESCRIPTION OF THE PREFERRED EMBODIMENTS

A more detailed description of the filtering method for reducing the preechoes of a digital audio signal will now be given in connection with FIGS. 2a and 2b.

Generally, the method which is the subject of the present invention carries out the processing of the preechoes of an original digital audio signal consisting of a sequence of samples x(n) consisting for example of blocks containing N samples. These samples are transmitted following a process for coding then decoding. The coding process can consist of a step, denoted 100, for processing by frequency transform, such as a processing by modified direct cosine transform, this step being followed by a step 101 for coding the coefficients y(k) obtained following step 100 as coded coefficients denoted Cy(k), whilst the decoding process consists for example of a step, denoted 200, for decoding the transmitted coded coefficients as coefficients y'(k) followed by a step for processing by inverse frequency transform 201, this transform being an inverse modified direct cosine transform, to recreate the post-transmission original signal, denoted x'(n).

Figure 2A:
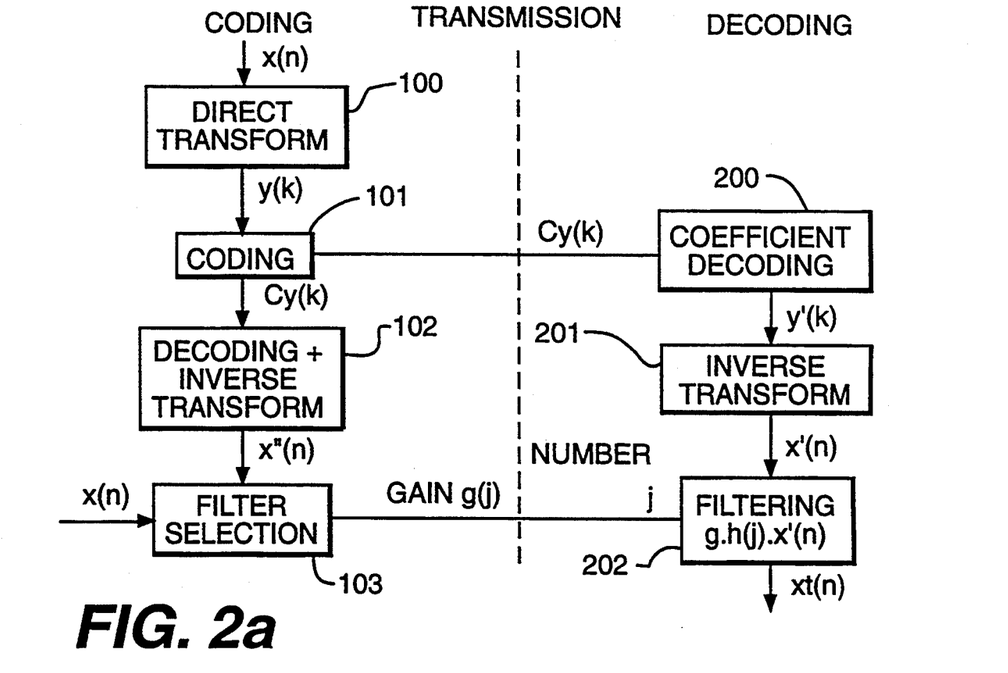
FIG. 2a represents, by way of illustration, the steps for implementing the method which is the subject of the invention.

Thus, as has furthermore been represented in FIG. 2a, the method which is the subject of the invention consists, during the coding process, after the aforesaid coding step 101, in performing on the coded coefficients Cy(k) a step for decoding these coded coefficients and for processing them by inverse frequency transform to recreate the decoded signal denoted x"(n).

Generally, the decoded signal x"(n) obtained at the coding level after implementing step 102 for decoding and processing by inverse frequency transform is regarded as identical to the post-transmission original signal x'(n) obtained after implementing step 201 for processing by inverse transform at decoding level, since these two signals differ only by the step for transmitting the coded coefficients Cy(k) to the decoding process, this transmission, carried out conventionally, being supposed to not substantially alter the values of the aforesaid coded coefficients.

Furthermore, as represented in FIG. 2a, the method which is the subject of the present invention next consists in determining in step 103 the optimal filtering template from a given set of filtering templates. The optimal filtering template is obtained by determining the gain and template parameters, that is to say with transfer function of the corresponding associated filtering, enabling the original signal x(n) to be recreated.

The method which is the subject of the present invention then consists in transmitting simultaneously to the decoding process the coded coefficients Cy(k) and the gain parameters denoted g(j) and matched filtering template to the aforesaid coding process.

According to a non-limiting advantageous mode of implementation, it will be noted that the transmitted filtering template parameter can, for example, consist of the serial number j of a specified filtering element making up the set of given filtering templates mentioned earlier.

Following transmission of the coded coefficients Cy(k) and of the gain g(j) and filtering j parameters to the decoding process, the method which is the subject of the present invention consists in performing at decoding level, after step 200 for decoding the transmitted coefficients and step 201 for processing by inverse frequency transform to recreate the post-transmission original signal x'(n), a matched filtering of the aforesaid post-transmission original signal to recreate the post-transmission and post-processed original signal, this signal being denoted xt(n) and the matched filtering operation being denoted 202 in FIG. 2a. Of course, the signal xt(n) is supposed substantially identical to the original signal x(n), the preecho phenomenon having been suppressed.

The implementation of the method for processing the preechoes of a digital audio signal which is the subject of the present invention is based on the following principle.

For an original signal x(n), the preecho noise b(n) and the decoded original signal reconstructed at the level of the decoding process after processing by inverse frequency transform satisfies the relation:

$$x'(n)=x(n)+b(n), \text{ with } x'(n)=x''(n).$$

At coding level, the three aforesaid signals are known, since x'(n)=x''(n), whilst at decoding level, only the post-transmission original signal x'(n) is available.

The Fourier transforms of these signals being denoted respectively X(f), B(f) and X'(f), the corresponding spectra X(f) and B(f) are generally disjoint and, accordingly, the noise b(n) can be deleted from the post-transmission original signal x'(n) with the aid of a filter whose impulse response will be denoted h(n) and the transfer function in the frequency domain will be denoted H(f). Furthermore, for the samples preceding a sudden plucking, the original signal x(n) very often exhibits a limited frequency spectrum. In fact, the preceding note, which in general corresponds to a low-frequency sinusoid, dies out. The filter with impulse response h(n) is therefore a low-pass type filter.

The filter selection step 103 as represented in FIG. 2a is performed in the frequency domain.

Generally, the filter hj(n) will be regarded as having been chosen during this selection step from a set of M filters whose impulse response is denoted hi, with i $\epsilon[0,M-1]$. This choice is made so that the result of the convolution product x''(n) * hj(n), where j is equal to one of the values of the aforesaid i, is as close as possible to x(n). The filter thus adopted is the one for which the product, in the frequency domain, Hj(f).X''(f) is closest to the spectrum of the aforesaid Fourier transform X(f).

The performance of the method which is the subject of the invention is naturally improved if a gain g(j) is associated with the filter hj(n).

According to a particularly advantageous aspect of the method which is the subject of the present invention, the latter takes account of the distance between the spectrum of the original signal X(f) and the product g(j).Hj(f).

The gain g and filtering template parameters having been selected, the filter number j and the value of the gain g are then transmitted to the decoding process.

The decoding process at the level of step 202 then performs a filtering step based on the impulse response hj(n) of the filter by computing the convolution product of the post-transmission original signal x'(n) arising from step 201, times the product g.hj(n) for the samples relevant to the preecho phenomenon.

A more detailed description of the filter selection process implemented in step 103 of FIG. 2a will be given in connection with FIG. 2b.

The problem of selecting the filter and of computing the gain consists in searching for, within a set of transfer functions, or of templates Hi, with i $\epsilon[0,M-1]$, the optimal filter or template Hj and in calculating the corresponding gain g(j) such that the Euclidean distance between the spectrum of the original signal X(f) and the spectrum of the filtered decoded signal is a minimum.

The adopted Euclidean distance finally selected is written:

$$Min_i \left[ \sum_{f=0}^{Fe/2} \| X(f) - g \cdot Hj(f) \cdot X''(f) \|^2 \right] \qquad (1)$$

In this relation, Fe is the frequency of sampling the original signal.

In the remainder of the description, g(j)=g denotes the value of the gain obtained for the value of the minimum Euclidean distance.

In accordance with a particularly advantageous aspect of the method which is the subject of the present invention, computation of the Euclidean distance is performed in a step 1030 following a processing by discrete Fourier transform of the original signal x(n) and of the decoded signal x''(n) obtained after implementing step 102. Processing by discrete Fourier transform is performed by discrete Fourier transform of size P, with P<N, and the expression for the minimum Euclidean distance is written:

$$Min_i \left[ \sum_{k=0}^{N/2} \| X(k) - g \cdot Hj(k) \cdot X''(k) \|^2 \right] \qquad (2)$$

The optimal gain g is then given by the relation:

$$g = Num(j)/Dem(j). \qquad (3)$$

The filter, or optimal template Hj, is then the one which is obtained when the expression $Num^2(j)/Dem(j)$ is a maximum. The step 1030 for computing the Euclidean distance is therefore followed by steps 1031 and 1032 allowing, on the one hand, computation of the optimal gain and, on the other hand, choice of the corresponding optimal filter.

It will be noted that in the above relations 2 and 3 defining, on the one hand, the optimal gain g and, on the other hand, the optimal filter Hj, the expressions are defined by the following relations:

$$Num(j) = \sum_{k=0}^{N/2} Hj,r(k) \cdot (Xr(k) \cdot X''r(k) + Xi(k) \cdot X''i(k)) + \qquad (4)$$

$$Hi,j(k) \cdot (Xi(k) \cdot X''r(k) - Xr(k) \cdot X''i(k))$$

and $$Dem(j) = \sum_{k=0}^{N/2} (Hj,r^2(k) + Hj,i^2(k)) \cdot (X''r^2(k) + X''i^2(k)) \qquad (5)$$

In the aforesaid expressions, Xr(k) and X''r(k) are the real parts of X(k), and X''(k) respectively, Xi(k) and X''i(k) being their imaginary parts.

Similarly, Hj,r and Hj,i are the real and imaginary parts of the transfer function or optimal template Hj.

Figure 2B:
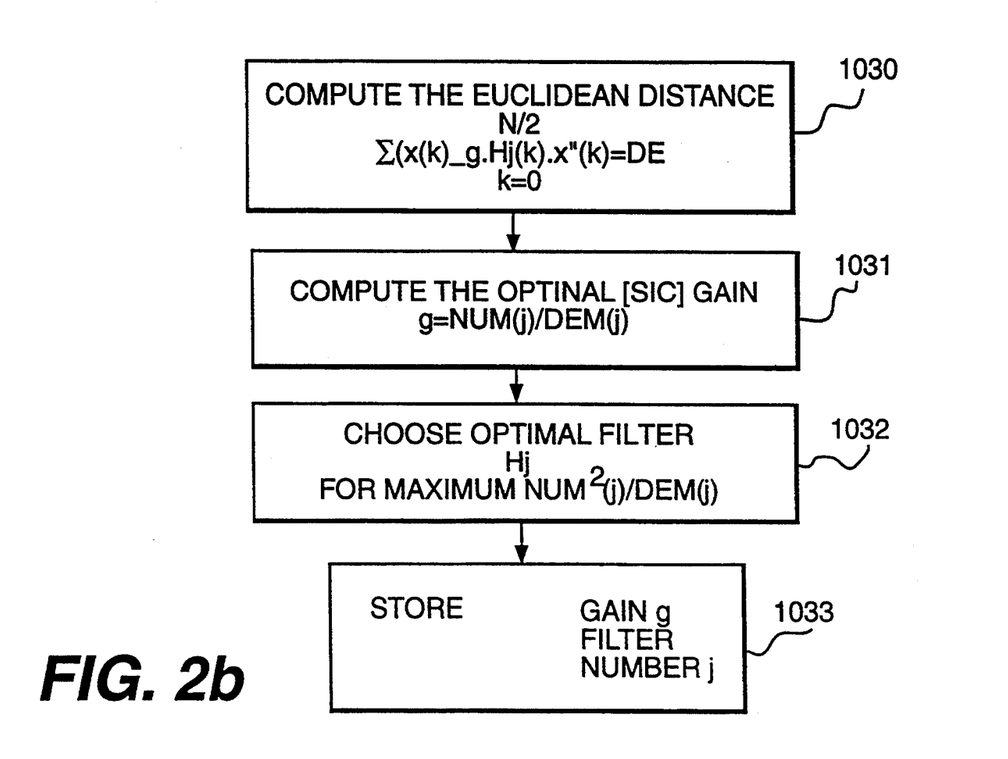
FIG. 2b represents, by way of illustration, a detail of the implementation of the method of processing preechoes which is the subject of the invention as represented in FIG. 2a, FIG. 3a represents, in block diagram form, a system for processing preechoes allowing the implementation of the method for processing preechoes which is the subject of the present invention.

The above step 1032 is then followed, as represented in FIG. 2b, by a step for storing the gain g and the corresponding optimal filter number j. The values of gain, g(j), namely the corresponding value of g and of filtering template, are labeled and stored by their address.

A more detailed description of a system for processing the preechoes of a digital audio signal according to the subject of the present invention, will now be given in connection with FIGS. 3a et seq.

Figure 3A:
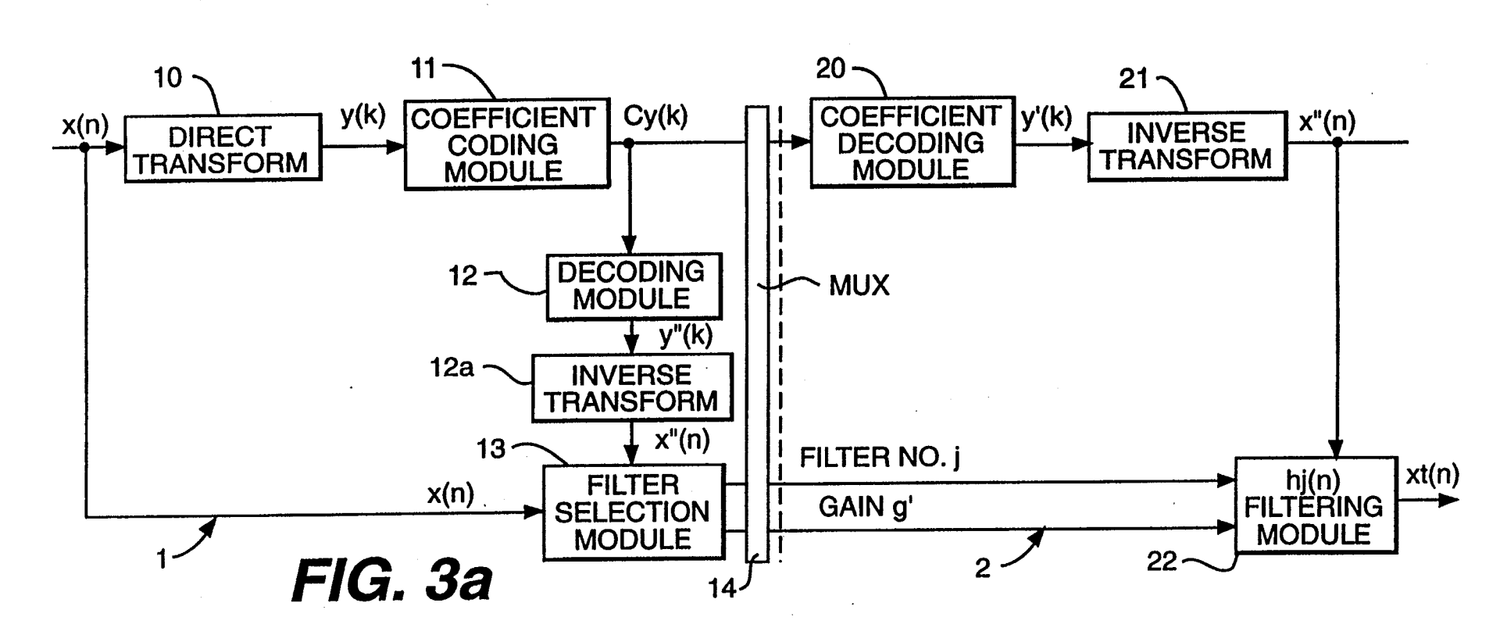

As represented in FIG. 3a, the coder device 1 comprises a module 10 for processing by frequency transform with coefficient y(k) the original sample sequence signal x(n). This module for processing by direct frequency transform of MDCT type, for example, will not be described since it corresponds to a conventional module. The coder furthermore includes a module 11 for coding these coefficients to provide for the transmission of the coded coefficients Cy(k). The system which is the subject of the present invention also includes, at the level of the decoder 2, a module 20 for decoding the transmitted coded coefficients Cy(k) as coefficients y'(k) and a module 21 for processing by inverse frequency transform, inverse MDCT, for example, to recreate the transmitted original signal x'(n).

According to an advantageous aspect of the system which is the subject of the present invention, the latter furthermore includes, at the level of the coder device downstream of the coding module 11, a module 12 for decoding the coded coefficients delivering estimated coefficients y"(k), a module 12a for processing the estimated coefficients y"(k) by inverse frequency transform to recreate the decoded signal x"(n). The modules 12 for decoding and 12a for processing by inverse frequency transform, inverse MDCT, will not be described, since they correspond exactly to the module 20, respectively 21, at decoder level, these modules being known from the prior art.

As will be noted from looking at FIG. 3a, the coder 1 also includes a module 13 for selecting the optimal parameters of the filtering and for storing the matched filtering parameters, gain g(j) and template Hj(f), of the relevant matched filtering. Finally, a multiplexing circuit 14 provides for a time multiplexing of the coded coefficients Cy(k) and of the filtering parameters, number j of the optimal filter adopted and of the corresponding optimal gain g to the decoder device 2.

The decoder device 2 includes a filtering module 22. Generally, the filtering module 22 advantageously comprises a filtering circuit including a plurality of elementary filtering modules having distinct specified filtering parameters, and a circuit for addressing on the basis of the received matched filtering parameters g and hj of the corresponding matched filtering module. This matched filtering module receives the transmitted original signal x'(n) and delivers the post-transmission and post-processed original signal xt(n).

The system for processing the preechoes of a digital audio signal which is the subject of the invention, such as represented in FIG. 3a, effects, in accordance with the method as described earlier in the description, the simultaneous transmission of the transform coefficients Cy(k) and of the filtering parameters, number of the filter j and its optimal gain g, being provided for by way of the multiplexing circuit 14 and of corresponding transmission circuits, which will not be described, these circuits corresponding to circuits of the prior art which are fully known to those skilled in the art [sic].

The filtering module 22 with the decoder 2 then makes it possible, simply by addressing the stored filtering template values and based on the values of gain, to carry out the processing by filtering the post-transmission original signal x'(n) to recreate the post-transmission and post-processed original signal xt(n).

Figure 3B:
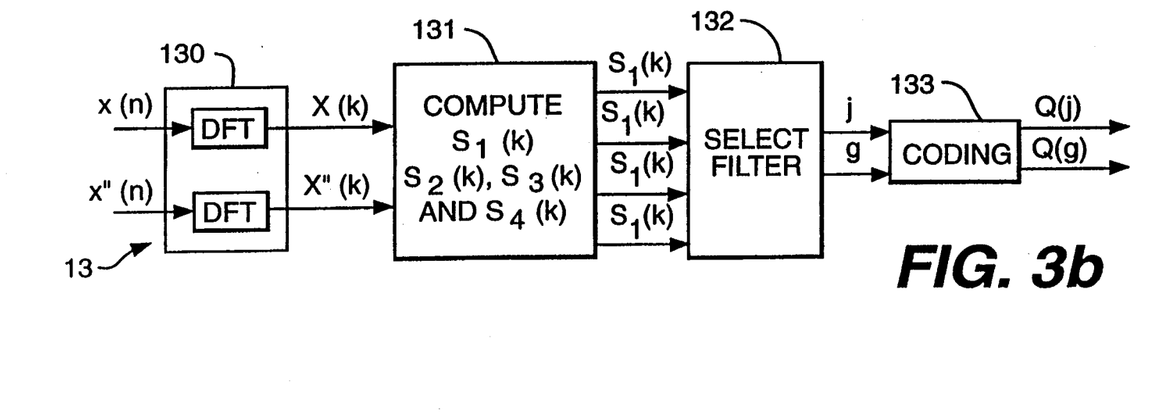
FIG. 3b represents, by way of example, a detail of the embodiment of a filter selection module making up, at coder level, the system represented in FIG. 3a, FIG. 3c represents, by way of example, a detail of the embodiment of a filter selection sub-module making up the filter selection module represented in FIG. 3b.

A more detailed description of an advantageous embodiment of the module for selecting the filter 13 represented in FIG. 3a will be given in connection With FIG. 3b. It will be noted that this embodiment naturally allows real-time processing of the original signal x(n) − and therefore the transmission of the transform coefficients Cy(k) and of the filtering parameters with a delay at most equal to one period for sampling the original signal. As represented in FIG. 3b, the module 13 for selecting the optimal parameters of the filter and for storing the matched filtering parameters, gain g(j) and template Hj(f) of the matched filtering, comprises a sub-module 130 for processing by discrete Fourier transform DFT over P samples with P<N the original signal x(n) and the decoded signal x"(n).

Thus, the sub-module 130 delivers respectively the direct Fourier transform coefficients X(k) and X"(k). It will be noted that the direct Fourier transform signals delivered are in fact the signals Xr(k), Xi(k) with k=0, ...,P/2−1, and X'r(k), X"i(k) with k=0,...,P/2−1. Here, the indices r and i designate the real and imaginary parts of the aforesaid direct Fourier transforms for the original signals and corresponding decoded signals. It will of course be noted that computation of the discrete Fourier transform can be carried out by means of the well-known circuits for fast Fourier transform FFT.

Furthermore, as represented in FIG. 3b, the module for selecting the optimal parameters of the filter comprises a sub-module 131 for computing notable values S1(k), S2(k), S3(k) and S4(k) from the transform coefficients X(k) and X"(k). It will be noted that the aforesaid notable values are representative of the energy and of the energy distribution of the original signal and of the decoded signal in the P samples taken into consideration, independently of the relevant filtering modules. It will also be noted that this independence results from the model adopted for the frequency responses. Thus, computation of the aforesaid notable values can therefore be undertaken prior to the procedure for selecting the filtering modules and need not therefore be carried out for each of the M filtering modules constituting the set of filtering modules from which the optimal filter is chosen, thus making it possible greatly to reduce the computational burden.

Furthermore, the module for selecting the optimal parameters of the filter 13 next includes a sub-module 132 for selecting the filtering modules, which receives as input the aforesaid notable values and delivers the matched filtering parameters, gain g(j) and template Hj(f) of the matched filtering, these parameters being delivered in the form of the number j of the filtering module adopted and corresponding value of gain g. Finally, a coding module 133 is provided which makes it possible to deliver corresponding coded coefficients Q(j) and Q(g), which may be transmitted for transmission by the multiplexer 15 to the decoder 2.

According to an advantageous characteristic of the sub-module 131 for computing the notable values, it makes it possible to compute the notable values below satisfying the relations:

$$S1(k) = (X''r(k))^2 + (X''i(k))^2 \qquad (6)$$

$$S2(k) = Xr(k).X''r(k) + Xi(k).X''i(k) \quad (7)$$

$$S3(k) = S4(k-1) + S1(k) \quad (8)$$

$$S4(k) = S5(k-1) + S2(k) \quad (9)$$

It will be noted that these values are all computed for $k=0, \ldots, P/2-1$, with $S3(O)=0$ and $S4(O)=0$.

A more detailed description of the sub-module, represented in FIG. 3b, for selecting the filtering modules 132 will be given in connection with FIG. 3c.

Generally, the sub-module for selecting the filtering modules essentially computes two numerical values denoted Num(i) and Dem(i) and makes it possible to search for the template or filter Hj enabling a maximum ratio $Num^2(j)/Dem(j)$ to be obtained.

Generally, the template characteristics of the filtering modules can be determined bearing in mind the remarks below relating to the schemes for effective filtering of the relevant signals.

So as to track possible nonstationarities in the original signal x(n), the transform block of N samples to be processed delivered by the processing module 130 of FIG. 3b dan be subdivided into sub-blocks of P points with P<N, in order to perform on each sub-block a separate computation for selecting the relevant filtering module. In an illustrative embodiment, for a block of N=1024 samples, the block may be divided into four sub-blocks of P=256 samples. Hence there are thus four values of gain g and four filter numbers j to be transmitted.

A more detailed description of the filter selection process will be given below in relation to a sub-block of size P, the processing being identical for each of the successive sub-blocks.

The filtering modules hi(n) are filters with finite and symmetrical impulse response. These filtering modules therefore constitute null phase filters and relations 4 and 5 above become:

$$Num(j) = \sum_{k=0}^{N/2} Hj,r(k) \cdot (Xr(k) \cdot X''r(k) + Xi(k) \cdot X''i(k)) \quad (10)$$

and $$Dem(j) = \sum_{k=0}^{N/2} Hj,r^2(k) \cdot (X''r^2(k) + X''i^2(k)). \quad (11)$$

The corresponding filtering modules are low-pass filter modules, only the cutoff frequency of which changes.

For a sampling frequency of 48 kHz for the original digital audio signal, the following parameters may be adopted by way of example:

the number of filtering modules adopted is for example M=32, and the length of their impulse response is L=49, this length being measured in sample duration.

These filtering modules are defined by the frequency response below:

Hi,r(f)=1.0 for f<fc(i), namely in the pass band,
Hi,r(f)=A for f>fa(i), namely in the attenuated band.
In terms of discrete Fourier transform coefficient:
Hi,r(k)=1.0 for k<kc(i),
Hi,r(k)=A for k>ka(i).

For 60 dB attenuation, the coefficient A equals 0.001 and the transition band, namely kc(i)<k<ka(i), is the same for all the filtering modules.

For each of the above-defined filtering modules, the three elementary parts of the frequency response are identical and only the limit of the pass band changes, namely kc(i), and accordingly that of the attenuated band ka(i).

It will of course be noted that the decomposition of the template or of the transfer function Hi,r of each filtering module into these three elementary parts allows a substantial simplification in the computation of the parameters Num(i) and Dem(i) which are necessary for selecting the rank j of the relevant filtering module and the corresponding value of gain g.

It will be noted that the M cutoff frequencies of the filtering modules fc(i) can be determined as a function of various criteria, for example, a logarithmic distribution on the frequency scale. The M frequency responses being fixed, procedures which are known in the state of the art for computing the filters can be used to determine the impulse responses, these being stored in memory at decoder level.

Figure 3C:
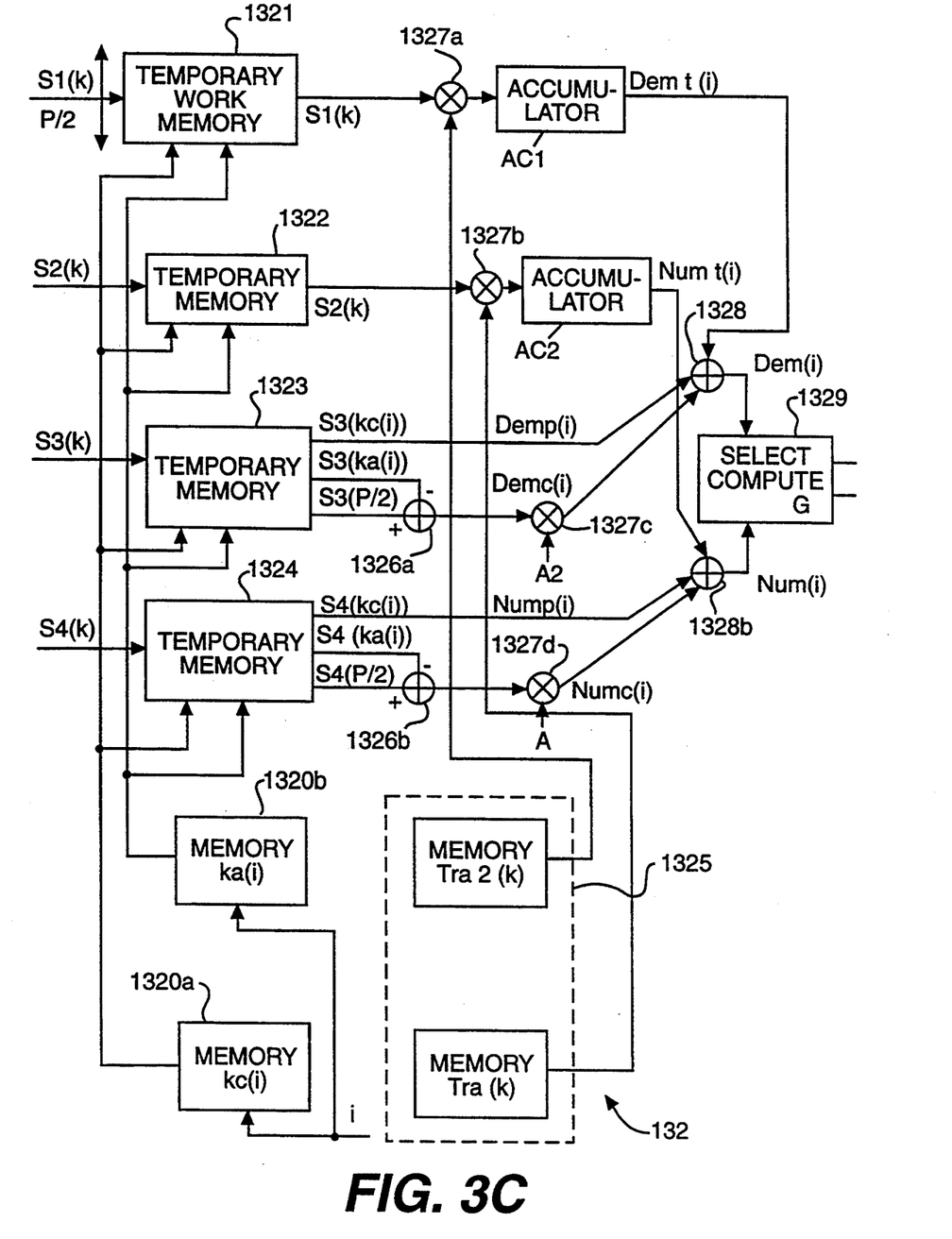

Represented in FIG. 3c is a particular arrangement of the filter selection module in a non-limiting advantageous embodiment.

As represented in the aforesaid figure, the module 132 for selecting the filtering modules advantageously includes a plurality of four storage blocks 1321, 1322, 1323, 1324 of random-access memory type, these blocks being intended for receiving and storing the notable values S1(k), S2(k), S3(k), S4(k) delivered by the sub-module 131 for computing them. Each storage block, conventionally, is read-addressable as a function of the physical addresses i of the filtering modules and, of course, of the values kc(i) and ka(i) defining the subdivision of the former into pass bands, transition bands and attenuated bands as mentioned before. It will be noted that the aforesaid storage blocks each deliver at their output the notable values for the relevant filtering module, following corresponding addressing, the storage blocks 1321, 1322 delivering the values S1(k) respectively S2(k) for k belonging to [kc(i), ka(i)], whilst the storage blocks 1323, 1324 deliver the notable value S3 respectively S4 for the value of k respectively equal to kc(i), ka(i), k=P/2. It will of course be noted, as represented in FIG. 3c, that the corresponding values of k are obtained from memories 1320a, 1320b, which are addressed through the current value i representing the number of the relevant filtering module. The memories 1320a, 1320b, may consist of memories of readonly memory type.

Furthermore, as represented in FIG. 3c, the filter selection sub-module comprises a circuit 1325 for storing a table of values Tra(k) and Tra2(k), these values being representative of the reference frequency response of the transition band. Furthermore, two subtracter circuits 1326a and 1326b receive the notable values S3(P/2) and S3(ka(i)) respectively S4(P/2) and S4(ka(i)) from the output of the third and fourth storage blocks, and each deliver the difference S3(P/2)−S3(ka(i)), and respectively S4(P/2)−S4(ka(i)).

The filter selection sub-module also includes a plurality of 4 multiplier circuits, denoted 1327a to d. The first multiplier circuit 1327a receives, on the one hand, the notable value S1(k) delivered by the first storage block and, on the other hand, the value Tra2(k) delivered by the storage circuit 1325. This first multiplier circuit delivers the product S1(k)*Tra2(k).

The second multiplier circuit 1327b receives, on the one hand, the notable value S2(k) delivered by the second storage block 1322 and, on the other hand, the value Tra(k) from the table of values delivered by the storage circuit 1325 and delivers the product S2(k)*Tra(k).

The third multiplier circuit 1327c receives, on the one hand, the difference S3(P/2)−S3(ka(i)) delivered by the first subtracter 1326a and, on the other hand, a constant value designated A2. This value A2 is equal to a value $A^2$, the value A representing the level of the frequency response in the cut off band. The third multiplier 1327c delivers the product A2*(S3(P/2)−S3(ka(i))).

Finally, the fourth multiplier circuit 1327d receives, on the one hand, the difference S4(P/2)−S4(ka(i)) delivered by the second subtracter 1326b and, on the other hand, the aforesaid constant value A. It delivers the product A*(S4(P/2)−S4(ka(i))).

Finally, as will be observed in FIG. 3c, a first and a second summing circuit 1328a, 1328b are provided. The first summing circuit 1328a receives, firstly, by way of an accumulator circuit, denoted AC1, the accumulated value Demt(i) of the products delivered by the first multiplier 1327a, secondly, the value Demp(i) equal to the notable value S3(kc(i)) delivered by the third storage block 1323 and, thirdly, the product Demc(i) delivered by the third multiplier 1327c. The first summing circuit 1328a delivers the corresponding sum Dem(i).

The second summing circuit 1328b receives, firstly, by way of an accumulator circuit AC2, the accumulated value Numt(i) delivered by the second multiplier, secondly, the value Nump(i)=S4(kc(i)) delivered by the fourth storage block 1324 and, thirdly, the value Numc(i) delivered by the fourth multiplier. It delivers the corresponding sum Num(i). The corresponding sums Dem(i) and Num(i) delivered by the first respectively the second summing circuit 1328a, 1328b, are delivered to a circuit 1324 for selecting the gain g(i)=-Num(i)/Dem(i) and the optimal filter Hj for maximum $Num^2(i)/Dem(i)$.

The operation of the filtering selection submodule 132 represented in FIG. 3c is then as follows:

Bearing in mind the type of frequency response of the filtering modules and of the decomposition of this response into three elementary parts identical as regards their form for all the filtering modules, the values Num(i) and Dem(i) delivered to the circuit 1329 for selecting the gain and the optimal filtering template are obtained in the manner below:

In the pass band:

$$Demp(i) = S3(kc(i) \text{ [sic]} \quad (12)$$
$$Nump(i) = S4(kc(i) \text{ [sic]} \quad (13)$$

In the transition band:

$$Demt(i) = \sum_{k=kc(i)}^{ka(i)} S1(k)*Tra2(k - kc(i)) \quad (14)$$

$$Numt(i) = \sum_{k=kc(i)}^{ka(i)} S2(k)*Tra(k - kc(i)) \quad (15)$$

It will be note that as regards the values Tra(k) delivered by the storage circuit 1325, these correspond to the reference frequency response of the transition band, this reference value is assumed to be the same for all the filtering modules.

The values Tra2(k) are the previous values of Tra(k) squared. The storage circuit 1325 can moreover consist of a read-only memory, for example.

In the attenuated band:

$$Demc(i) = A2*(S3(P/2) - S3(ka(i))) \quad (16)$$

$$Numc(i) = A*(S4(P/2) - S4(ka(i))). \quad (17)$$

The values delivered by the summing circuits 1328a and 1328b and used by the gain selection circuit 1329 are finally obtained from:

$$Dem(i) = Demp(i) + Demt(i) + Demc(i) \quad (18)$$

$$Num(i) = Nump(i) + Numt(i) + Numc(i) \quad (19)$$

For each of the filtering modules, that is to say for each index value i, the gain selection circuit 1329 checks whether the criterion maximum $Num^2(i)/Dem(i)$ is satisfied. If it is, the values Num(j) and Dem(j) are retained, the corresponding value of the gain g(j) is stored as is the aforesaid corresponding value j.

After examining all the filtering modules, that is to say after iterating on the value of i, i belonging to [0,M−1], it is then possible to compute the gain g, this gain next being quantized by the coding module 133 represented in FIG. 3b. Of course, this quantization can be performed directly from the values of Num(j) and Dem(j). By way of non-limiting example it will be pointed out that the coding module 133 can consist of a 4-bit uniform quantizer with dynamic range [0,2]. It will also be pointed out that the index j of the optimal filter can for its part be transmitted over log2(M)bits.

Finally, it will noted as regards the preecho processing system which is the subject of the present invention as represented in FIG. 3a, that at the level of the decoder 2, the processing to be performed includes the reading of the impulse response hj(n) into a memory of M elements. The address of the corresponding impulse response hj(n) is given simply by the index j received following the transmission and filtering performed at the level of the filtering module 22, the aforesaid impulse response being multiplied by the dequantized gain. The dequantized gain is considered to correspond to the gain g transmitted during the transmission process.

Figure 4A:
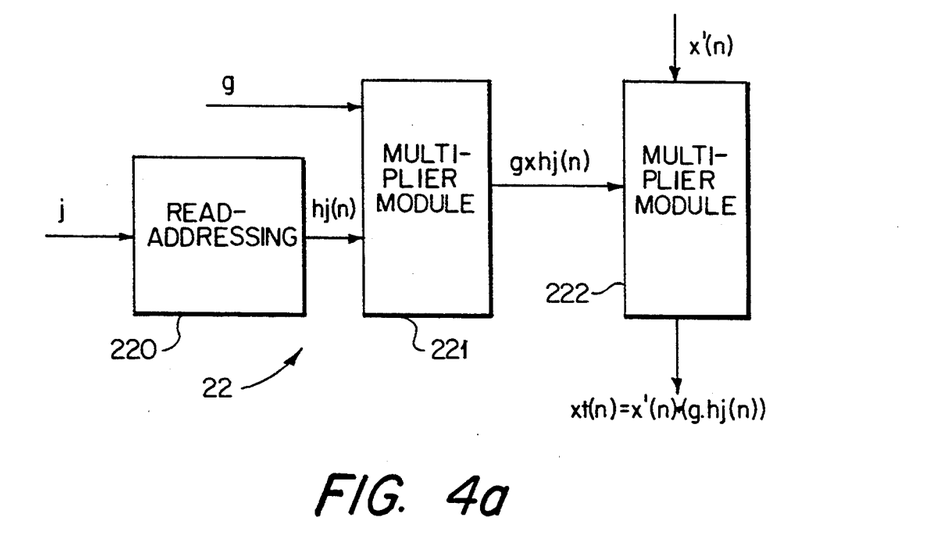
FIG. 4a represents a detail of the embodiment of the optimal filtering module at decoder level, according to the subject of the present invention.

The filtering module as represented in FIG. 4a can comprise a read-addressing module 220, which, from the value of j transmitted, makes it possible to obtain the impulse response hj(n). A first multiplier module 221 receiving the impulse response hj(n) and the dequantized value of gain g delivers the product g.hj(n) to a second multiplier module 222, which delivers the convolution product xt(n)=x'(n)*(g.hj(n)) constituting the post-transmission and post-processed original signal.

Figure 4B:
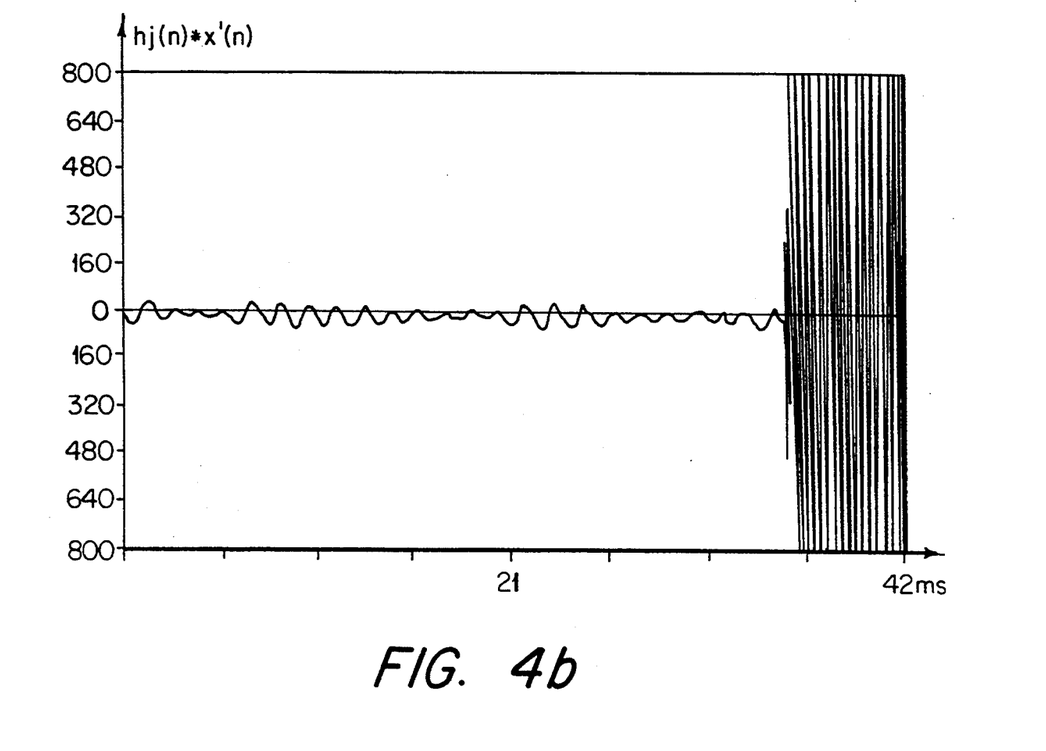
FIG. 4b represents a timing chart of the post-processed transmitted signals in which the preecho phenomenon has been suppressed.

FIG. 4b represents the result of implementing the method which is the subject of the present invention on a signal giving rise to a preecho phenomenon as represented in FIG. 1c. On looking at the aforesaid FIG. 4b, it is observed that the preecho noise is suppressed and that the restored waveform, namely xt(n)=(x'(n)*g*hj(n)), is very close to the original signal.

A filtering method and device for reducing the preechoes of a digital audio signal has thus been described which is particularly powerful in so far as entirely satisfactory operation has been obtained on numerous types of signals affected by preechoes. Furthermore, the method and the device which are the subjects of the present invention are particularly simple to implement, in particular at the level of the decoder where the processing, that is to say the filtering, is reduced and thus corresponds to the possibilities offered.

I claim:

1. A method for processing the preechoes of an original digital audio signal which is formed of a sequence of samples x(n) and comprises successive blocks of N samples, said original digital audio signal being transmitted after a process of coding and then decoding and thus being subjected to a preecho-phenomenon, said coding process including a step for processing said samples by frequency transform as coefficients y(k) followed by a step for coding said coefficients so as to provide coded coefficients Cy(k) for transmission, and said decoding process, after reception of transmitted coded coeffients, including decoding said transmitted coded coefficients as transmitted coefficients y'(k) followed by processing by inverse frequency transform of said transmitted coefficients, so as to recreate a post-transmission original digital audio signal x'(n), said method further comprising the following steps:

during said coding process, after said step for coding said coefficients, performing a step for decoding said coded coefficients and for processing said coded coefficients by inverse frequency transform so as to recreate a decoded original signal x"(n), determining from said decoded original signal x"(n) an optimal matched filtering template from a given set of filtering templates and the gain parameters of the corresponding filtering, simultaneously transmitting to said decoding process said coded coefficients Cy(k) and said gain parameters and optimal matched filtering template, and during said decoding process, after said step for decoding said transmitted coefficients and said step for processing by inverse frequency transform to recreate said post-transmission original signal, performing said matched filtering of said post-transmission original signal x'(n) from said optimal matched filtering template so as to create a post-transmission and post processed original signal xt(n) substantially similar to said original digital audio signal x(n), thereby enabling said preecho phenomenon to be suppressed.

2. The method as claimed in claim 1 wherein said step of determining the gain parameters and filtering template of said optimal matched filtering comprises:

performing a Fourier transform of said original digital audio signal x(n) so as to obtain the frequency spectrum X(f) thereof;

performing a Fourier transform of said decoded original signal x"(n) so as to obtain the frequency spectrum X"(f) thereof;

determining from a set of values of gain g(j) corresponding to said gain parameters and from said given set of filtering templates, with transfer function values Hj(f) in the frequency domain, a filtering product $P(f)=g(j).Hj(f).X''(f)$ of said frequency spectrum of said decoded original signal by said values of said gain and said filtering templates of transfer function values Hj(f) in the frequency domain, determining the minimum Euclidean distance between the frequency spectrum of said original signal and said filtering product, and storing corresponding particular values of said gain g(j) and of said filtering template with transfer function values Hj(f) constituting said gain and matched filtering template for said minimum Euclidean distance, thereby providing a filter the filtering product of which is the closest to said frequency spectrum of said original signal to be selected.

3. The method as claimed in claim 2, wherein said values of gain g(j) and of filtering template forming said sets of values of gain and of filtering template are labeled and stored by their address.

4. A system for processing the preechoes of an original digital audio signal which is formed of a sequence of samples x(n) and comprises successive blocks of N samples, said original digital audio signal being transmitted between a coder device and a decoder device and thus being subjected to a preecho-phenomenon, said coder device including a module for processing said samples by frequency transform as coefficients y(k) and a module for coding said coefficients to coded coefficients Cy(k) so as to provide for the transmission of said coded coefficients to said decoder device, said decoder device including a module for decoding said transmitted coded coefficients as transmitted coefficients y(k) and a module for processing said transmitted coefficients by inverse frequency transform, so as to recreate a post-transmission original digital audio signal x'(n), said system further comprising, at the level of said coder device, downstream of said coding module:

a module for decoding said coded coefficients Cy(k) and for delivering estimated coefficients y"(k);

a module for processing said estimated coefficients by inverse frequency transform to recreate from said estimated coefficients a decoded original signal x"(n);

a module for selecting from said decoded original signal x"(n) the optimal filtering parameters and for storing matched filtering parameters, gain g(j) and template of transfer function Hj(f) of said matched filtering from a set of values of gain and filtering templates; and means for providing time-multiplexing of said coded coefficients and said matched filtering parameters to provide for their simultaneous transmission to said decoder device.

5. The system as claimed in claim 4 wherein said module for selecting the optimal filtering parameters, gain g(j) and template of transfer function Hj(f) of said matched filtering comprises:

a sub-module for processing by discrete Fourier transform over a number P of samples under consideration, with P being less than the number N of samples per block, said original digital audio signal x(n) and said decoded original signal x"(n), and for delivering corresponding transform coefficients X(k) and X"(k), respectively, where K designates the rank of each of said samples under consideration;

a sub-module for computing notable values from said transform coefficients, said notable values being representative of the energy and of the energy distribution in said samples under consideration, independently of said filtering parameters, and being related to said rank k of said samples under consideration;

a sub-module for selecting a filtering module among filtering modules, for receiving as input values said notable values, and for delivering as output values said matched filtering parameters, gain g(j) and template H(j) of said optimal filtering, said matched filtering parameters being delivered in the form of the number j of the filtering module and corresponding value of gain g(j).

6. The system as claimed in claim 5, wherein the filtering provided by the system includes a transition band and a cut-off band and wherein said sub-module for selecting the filtering modules includes:

first, second, third and fourth storage blocks of random-access memory type, for receiving and storing said notable values formed of a set of first, second, third and fourth notable values received by respective ones of said first, second, third and fourth storage blocks, each storage block being read-addressable as a function of the physical address of the filtering modules and delivering each said notable value to a corresponding filtering module of said filtering modules, means of storing and delivering a table of first and second representative values representative of the reference frequency of the transition band;

substracter means, comprising first and second substracters, for receiving from said third and fourth storage block, a third and fourth notable values respectively having first and second particular values corresponding each to a given rank of said samples and defining a frequency band subdivision of said filtering module, said first and second substracters delivering the difference value between said first and second particular values of said third and fourth notable values respectively;

first, second, third and fourth multiplier circuits, said first multiplier circuit receiving, on the one hand, said first notable value delivered by said first storage block, and, on the other hand, said second representative value and delivering a first product comprising the product of said first notable value and second representative value, said second multiplier circuit receiving, on the one hand, said second notable value delivered by said second storage block, and, on the other hand, said first representative value and delivering a second product comprising the product of said second notable value and first representative value, said third multiplier circuit receiving, on the one hand, said difference value between said first and second particular values of said third notable value, referred to as a third notable difference value, delivered by said first substracter, and, on the other hand, a constant value which is the square value of a given value representing the level of the frequency response in the cut-off band, said third multiplier delivering thus a product, referred to as a third product, of said third notable difference value and said constant value, said fourth multiplier circuit receiving, on the one hand, said difference value between said first and second particular values of said fourth notable value, referred to as fourth notable difference value, delivered by said second substracter, and, on the other hand, said given value representing the level of the frequency response in the cut-off band, said fourth multiplier circuit delivering a fourth product corresponding to the product of said fourth notable difference value and said given value;

a first summing circuit receiving firstly, through an accumulator circuit, an accumulated value of said first product delivered by said first multiplier, and, secondly, said third notable value delivered by said third storage block for a particular value of said rank k defining the pass-band of said filtering module, and, thirdly, said third product delivered by said third multiplier, and delivering a corresponding first sum, and a second summing circuit receiving, firstly, through an accumulator circuit, an accumulated value of said first product delivered by said first multiplier, and, secondly, said fourth notable value delivered by said fourth storage block for a particular value of said rank k defining the pass-band of said filtering module, and, thirdly, said fourth product delivered by said fourth multiplier, and delivering a corresponding second sum, and a circuit for selecting the gain parameter value g(i) expressed as the ratio of said second sum and said first sum and optimal filter template for the maximum of a ratio of the square of said second sum to said first sum.

7. The system as claimed in claim 4, wherein said system further includes, at the level of said decoder device:

filtering means including a plurality of elementary filtering modules having distinct specified filtering parameters; and means for addressing, on the basis of said received matched filtering parameters, a matched elementary filtering module of said elementary filtering modules, said matched elementary filtering module receiving said transmitted original signal x'(n) and delivering said post transmission and post processed original signal xt(n).

8. The system as claimed in claim 7, wherein each elementary filtering module is defined by its filtering parameters, values of gain g(i) and of filtering template, which are labelled and stored by their address.

* * * * *